Dec. 19, 1967    F. G. GEIL ET AL    3,359,537
TRANSDUCER
Filed June 30, 1964    2 Sheets-Sheet 1

WITNESSES
Robert C. Baird
John L. Chopp

INVENTORS
Fred G. Geil, John H. Thompson
and Robert H. Whittaker.
BY
Dean Schron
ATTORNEY

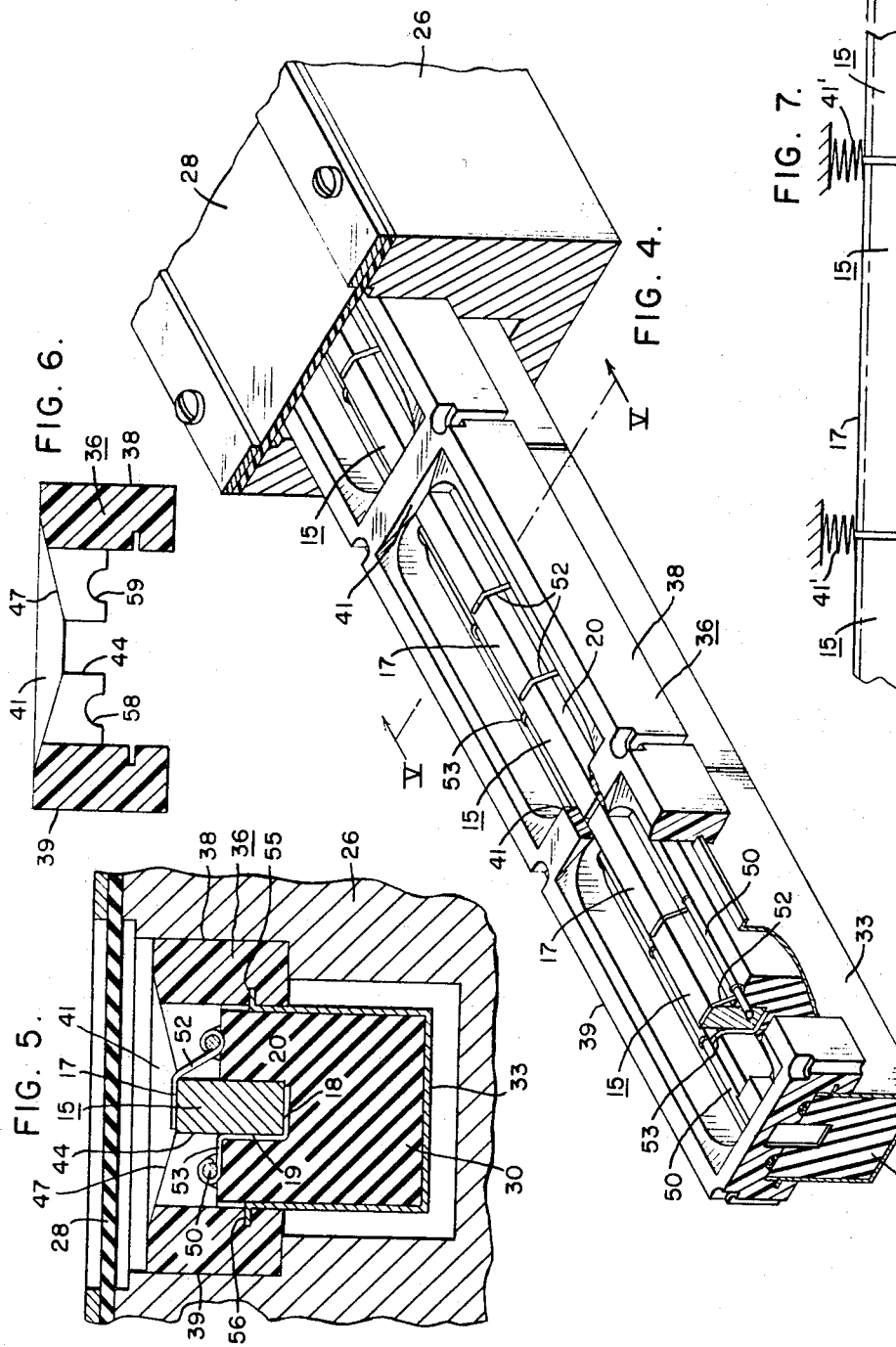

United States Patent Office 3,359,537
Patented Dec. 19, 1967

3,359,537
TRANSDUCER
Fred G. Geil, Verona, Robert H. Whittaker, Franklin Township, Export, and John H. Thompson, Penn Hills, Pa., assignors to Westinghouse Electric Corporation, East Pittsburgh, Pa., a corporation of Pennsylvania
Filed June 30, 1964, Ser. No. 379,111
18 Claims. (Cl. 340—8)

This invention in general relates to transducers, and more in particular to a transducer for use in side looking sonar systems.

In side looking sonar systems, a transducer is generally mounted on either side of a surface or underwater carrier vehicle which travels along a course line. Acoustic energy is propagated in a certain beam pattern to either side of the vehicle by the transducers and energy reflected from the bottom is picked up by receiving transducers. As the vehicle continues along its course line an indicating apparatus "paints" a picture of the bottom in accordance with the reflected transmitted signal. In order to obtain high resolution, it is important that a certain beam pattern be maintained. It is desirable that the beam width in a plane perpendicular to the bottom be extremely large, for example, approaching 90°, and that the beam in a plane substantially parallel to the bottom be less than 1°. To obtain this specific type of beam pattern, an elongated transducer is utilized wherein the length may be in the order of several feet. The oscillatory driving element of the transducer is generally of a rectangular cross section with the distance between the two side surfaces being in the order of a wavelength of the sound transmitted and the distance from the front radiating to the rear surface being in the order of a multiple of a half wavelength. Since the transducer may be operated in the kilocycle range, the oscillatory driving element generally has a distance from the radiating surface to the rear surface of less than half an inch, with the radiating surface having dimensions of several feet by less than half an inch. A typical oscillatory driving element utilized is a piezoceramic such as barium titanate. Since a single piece of driving element such as barium titanate having the aforementioned dimensions would be extremely brittle and hard to handle, the oscillatory driving element is generally made up of a plurality of smaller elements each of which may be a few inches in length, and arranged in end to end relation, forming a line array. In order to maintain the proper beam pattern, it is essential that the radiating surface of each of the drive elements be maintained in the same plane. This requirement necessitates the extremely accurate matching of driving elements, or alternatively, the time consuming operation of placing various size shims under the elements between the elements and a supporting or indexing member.

Schemes to solve the proper positioning problem include the use of a solid plastic member abutting the radiating surfaces of the oscillatory elements of the array. For side looking sonar applications this proved to be unfeasible since shear modes excited within the plastic cause severe beam distortion.

The oscillatory elements are generally backed by a pressure release material which in essence simulates an air backing so that maximum acoustic energy is radiated from the front surfaces of the driving elements. Popular pressure release materials utilized take the form of a cork and neoprene rubber substance known as Corprene, foam epoxys, and foam polystyrene plastics. The transducer unit is placed in a housing with a covering member having the same transmission characteristics as seawater and utilized to isolate the transducer from the seawater. In order to equalize and distribute pressures which may be encountered at fairly deep oceanic depths, the housing is filled with a liquid, such as high grade castor oil, having the same transmission characteristics as seawater. At depths of several hundred feet, such a transducer provides satisfactory operation in maintaining its desired beam pattern for scanning. However at greater depths, for example at 1000 feet and below, the pressure release backing, due to the water pressure transmitted thereto through the covering member and oil, becomes compressed and tends to pull away from the driving element, and the oil fills the space between the backing and the element. Where the backing pulls away to the extent that the distance between it and the element is equal to a quarter wavelength, a transmission line analogy occurs wherein the oil film acts as a quarter wavelength transformer and tends to couple the energy radiated by the driving element out of the back surface thereof, tending to cause an erratic loading on the various driving elements of the array which decreases efficiency and severely distorts the desired beam pattern. As greater pressures are encountered all of the air is crushed out of the pressure release backing material which is compressed to a small fraction of its original size, and transducer operation is destroyed.

It is therefore an object of the present invention to provide an improved underwater sound transducer particularly well adapted for side looking sonar systems.

Another object is to provide a side looking sonar transducer which will produce a more desirable beam pattern than heretofore.

Another object is to provide a transducer which will operate properly at greater oceanic depths than heretofore.

A further object is to provide a side looking sonar transducer which will provide an undistorted beam pattern at the pressures encountered at thousands of feet below the surface of the sea.

Another object is to provide a deep water operating sonar transducer which is of relatively simple construction.

Another object is to provide an underwater transducer the construction of which finds applicability with straight line and curved line oscillatory element arrays.

Briefly, in accordance with the above objects, there is provided a transducer having a plurality of oscillatory driving elements arranged end to end in a linear array. Each of the driving elements has a front, or radiating surface, a rear surface, and side surfaces. Surrounding the rear, and extending up the side surfaces, is a backing material having an acoustic impedance substantially equal to that of the fluid medium in which the transducer operates, and further characterized in being a sound absorbing material. A plastic positioning member maintains the oscillatory driving elements of the array in their predetermined orientation and in addition maintains the radiating surface of each driving element substantially in a common plane. The positioning member contacts the front surface of the driving element at spaced apart areas constituting a small minority of the total surface area, with the space between the contact areas being out of contact with the positioning member. Electrical busses extending in the same direction as the linear array are operatively connected to the driving elements for coupling electric energy to and from the driving elements.

The above stated, as well as further objects and advantages of the invention will become apparent after a reading of the following detailed specification taken in conjunction with the drawings, in which:

FIG. 4 illustrates an isometric view, partially in section, of the transducer in accordance with the present invention;

FIG. 5 illustrates, partially in section, a view of the transducer of FIG. 4 taken along the lines V—V;

FIG. 6 illustrates a portion of FIG. 5 in greater detail; and

FIG. 7 illustrates a spring analogy of the support of the driving element utilized in the present invention.

Figure 1A:
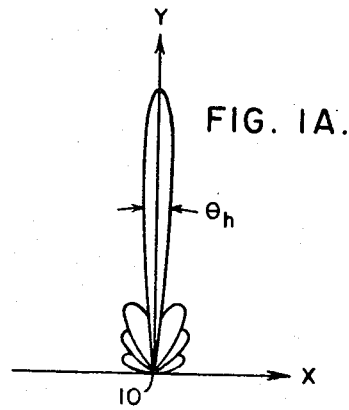
FIGURES 1A and 1B illustrate two views of the beam pattern obtained with the present invention.
Figure 1B:
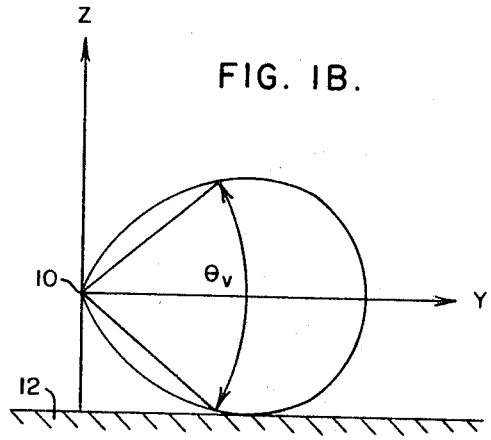

Referring now to FIGS. 1A and 1B, there is shown two views of the beam pattern desired for a side looking sonar system. FIG. 1A illustrates the narrow beam pattern and FIG. 1B illustrates the broad beam pattern perpendicular to the narrow beam pattern. The transducer for providing this beam pattern is assumed to be at point 10 which travels in the direction of the X axis representing the direction of travel, or course line, of the vehicle upon which the transducer is mounted. In order to obtain high resolution, the narrow beam pattern should be extremely small, for example in the order of .05 to .5 degree measured at the half power points. $\theta_h$ of FIG. 1A represents the half power angular width, which is a function of the length of the transducer and the wavelength in water of the operating frequency. The Y axis is perpendicular to the direction of travel and extends in the direction in which the acoustic energy is propagated.

In FIG. 1B the transducer at point 10 travels in a direction toward the viewer. The Z axis represents the perpendicular from the ocean (or river, estuary, etc.) bottom 12 and in order to receive acoustic returns from the bottom 12 in an area as close to the Z axis as possible, it is desired that the broad beam of FIG. 1B have an angular width approaching 90°. The half power angular width $\theta_v$ is a function of the width of the oscillatory driving elements radiating surface and the wavelength, in water, of the operating frequency.

Figure 2:
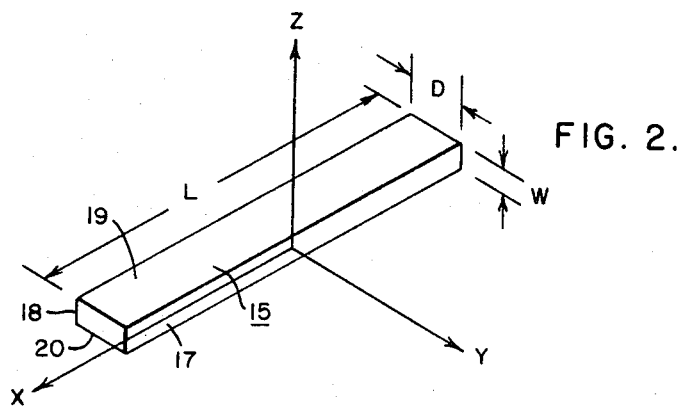
FIG. 2 illustrates the relative dimensions of the oscillatory driving elements used herein.
Figure 3A:
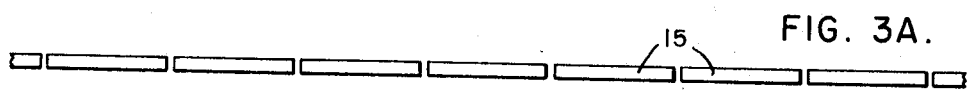
FIG. 3A and 3B illustrate two types of oscillatory driving element arrays.
Figure 3B:
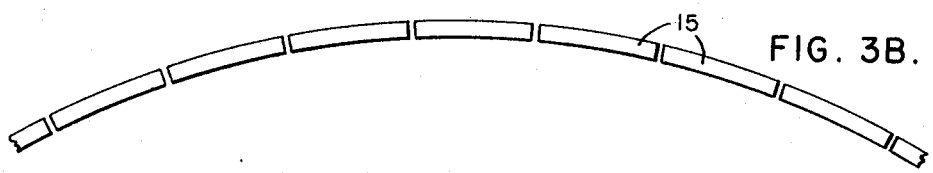

FIG. 2 illustrates a typical oscillatory driving element having a length L, a depth D, and a width W. The element is elongated along a longitudinal axis extending in the same direction as the X axis. The X, Y and Z axes of FIG. 2 represent the X, Y and Z axes of FIGS. 1A and 1B. Various types of oscillatory driving elements may be utilized herein, common elements being for example electrostrictive elements such as quartz, and piezoceramic elements such as lead zirconate titanate and barium titanate. The driving element 15 has a front radiating surface 17 and a rear surface 18 and includes parallel side surfaces 19 and 20. The depth D from the front surface 17 to the rear surface 18 is preferably $n\lambda/2$ where $\lambda$ is the wavelength of the acoustic energy in the driving element 15, and $n$ is an odd whole number, generally equal to 1. In this manner, when electric energy is supplied to the driving element 15, the front surface 17 and the rear surface 18 travel in opposite directions symmetrically about a stationary plane midway between the front and rear surfaces 17 and 18. In order to obtain a desirable broad beam characteristic as shown in FIG. 1B, the width W of the driving element 15 is preferably in the order of approximately ¾ of a wavelength, in water, of the acoustic energy. Since the narrow beam pattern is a function of the length L, it is desirable that L be extremely large compared to the other dimension of the driving element 15 so that a high resolution beam may be produced. A length in the order of 150 wavelengths or greater is desirable. At an operating frequency of, for example, 220 kc., the length L would be in the order of approximately 45 inches and the width W a little over 2/10 of an inch. An elongated driving element having these dimensions is extremely difficult to manufacture, ship, and handle so smaller elements having a length in the order of a few inches may be placed in end to end relationship to provide a linear array functionally identical to a single strip of driving element. In FIGS. 3A and 3B there is shown two forms of linear arrays comprising a plurality of driving elements arranged in end to end fashion. In FIG. 3A the driving elements are arranged in a straight line array while in FIG. 3B a curved line array is illustrated, the number of driving elements in each array being dependent upon the application and design characteristics of the overall system.

A transducer assembly is illustrated in FIGS. 4 and 5. A housing 26 is provided for mounting the transducer assembly, and in some instances the housing may be the vehicle hull, and in other instances the housing 26 may be mounted on the vehicle hull. A covering member 28 is provided to keep the seawater from contacting the transducer assembly. In FIG. 4 only a portion of the covering member is shown for purposes of better illustrating the transducer assembly. To obtain maximum transmission and minimum reflection of sound passing through two adjacent media, it is necessary to match their acoustic impedances. Basically, the acoustic impedance is a function of the material density $\rho$ and the sound velocity C in the material and is equal to $\rho \times C$. The covering member may be of a rubber material known as Rho-c rubber which has an acoustic impedance substantially equal to the acoustic impedance of seawater. A plurality of elongated oscillatory driving elements 15 is arranged in a straight line array having the characteristics as described with respect to FIG. 2. For purposes of clarity, only a few such elements have been illustrated. A second array may be located in the housing 26 so that one array may transmit and the second array may receive acoustic energy. Surrounding the rear surface 18 and extending up the side surfaces 19 and 20 of the oscillatory driving element means 15 is a backing material 30 characterized in being sound absorbing and having an acoustic impedance substantially equal to the acoustic impedance of seawater, or other fluid mediums in which the transducer may be operated. One type of backing material which has the aforementioned characteristics is sound absorbing rubber comprising a butyl rubber having aluminum powder or flakes embedded therein. A U-shaped channel member 33 may be provided to hold the backing material 30 which may be formed of a plurality of slabs or may be of a single mass having a notch therein for receiving the driving element 15.

In order to maintain the positional orientation of the oscillatory driving means 15 there is provided positioning means 36 in the form of a plastic web member having elongated side members 38 and 39 extending in the direction of the line array and having cross members 41 which contact a small area on the surface 17 of the oscillatory driving elements 15 near the ends thereof. More particularly the cross members of the positioning means, contacts each of the driving elements 15 at spaced apart contact areas on the front surface thereof at the abutting end portions such that the front surface of the driving element 15 between the contact areas are out of contact with the positioning means 36. The contact area is preferably less than 10% of the total area. The cross members 41 in conjunction with the side members 38 and 39 form a plurality of elongated apertures, the major portion of the front surfaces 18 of the driving elements 15 being aligned with these apertures. The cross members 41 of the positioning means 36 are operable to maintain the front surface 17 of each of the driving elements 15 substantially in the same common plane, such as by contacting the front surface of the driving element, an important consideration in maintaining the desired beam pattern shown in FIGS. 1A and 1B. The cross member 41, as best shown in FIG. 6, includes an indent portion 44 which when in contact with the driving element 15 is operable to accurately position the front surfaces of the driving elements 15 and maintain the elements in compressive contact with the backing member 30. In order not to interfere with the vertical beam pattern, the side members 38 and 39 of the positioning means 36 have beveled portions 47 so that the positioning means is effectively out of the path of the acoustic beam produced by the oscillatory driving element 15.

Electrical bus bars 50 extending substantially in the direction of the line array are provided for supplying electric energy to and conducting electrical energy from the driving element 15. Means for electrically connecting the bus bars with the driving elements take the form of flexible leads 52 and 53 connected to the front surface 17 and the rear surface 18 respectively of the driving element 15, the contact being made by way of conducting epoxy cement for example. If desired, the cross member 41 may have grooves 58 and 59 therein such as shown in FIG. 6 for restraining movement of the bus bars.

Flange portions 55 and 56 of the U-shaped channel member 33 are mated with the positioning means 36 by means of slots in the side members 38 and 39 respectively. Positioning means 36 is affixed to the housing 26 and in order to equally distribute pressures, the transducer is filled with a fluid medium such as high grade castor oil having an acoustic impedance approximately equal to that of water.

The U-shaped channel member 33 in conjunction with the positioning means 36 acts in a manner to precompress the backing material 30 so that contact between the front surface of the driving elements 15 and the positioning means is always maintained. Ofter the various piezoceramic driving elements are made in different batches and have slightly differing characteristics. With respect to FIG. 2 it was stated that the distance from the front surface 17 to the rear surface 18 should be in the order of $\lambda/2$ since $\lambda$ is a function of the speed of sound in the material, $\lambda$ may vary from element to element and consequently the distance from the front surface 17 to the rear surface 18 may vary, depending upon the characteristics of the oscillatory driving element. The transducer of the present invention eliminates the need for special shims under the various elements to maintain their front surfaces in a common plane, by indexing, that is, maintaining the positional orientation of the driving elements 15 by contact with the front surfaces thereof and since the major portion of each of the oscillatory elements 15 is out of contact with the indexing, or positioning means 36, acoustic energy will be coupled to the water medium through the castor oil and covering member 28. As the driving elements 15 oscillate, acoustic energy is propagated from the front surface 17 and in addition acoustic energy is radiated from the rear surface 18. If the backing material 30 were a pressure release material such as Corprene, simulating an air backing, substantially all of the acoustic energy would be radiated from the front surface. Tranducers utilizing these pressure release materials provide satisfactory operation up to a certain depth beyond which, as the pressure increases, the air cells in the pressure release backing material collapse, changing the acoustic impedance so that the effect of the air backing is no longer present. As the pressure equalizing fluid fills the spacing between the oscillatory element and the pressure release material a point is reached wherein the distance is equal to a quarter wavelength which, acting as an acoustic transformer, load the driving elements in an erratic manner resulting in a complete distortion of the radiated beam. The transducer of the present invention eliminates these problems by having as the backing member 30 sound absorbing material having an acoustic impedance substantially equal to that of the water in which the transducer is operating and the pressure distributing fluid within the transducer. Acoustic energy radiated from the rear surface 18 of the driving elements 15 is propagated through, and absorbed in, the sound absorbing backing material 30. The small amount of acoustic energy which may not be absorbed is absorbed after reflection from the U-shaped channel member 33 so as not to affect the oscillatory elements 15. Any quarter wavelength oil film which may form between the driving element 15 and the backing material 30 does not cause erratic loading since the oil also has an acoustic impedance substantially equal to the backing material 30 and is matched thereto so that in effect half the radiation propagates forwardly of the front surface 17 and half propagates rearwardly of surface 18.

As was stated, the positioning means 36 is operable to maintain the front surface 17 of the driving elements 15 in a substantially common plane. FIG. 7 schematically illustrates the oscillatory movement of the driving elements 15. The sound absorbing backing material is represented in FIG. 7 by the spring means 30' schematically shown as being distributed along the rear surface 18 of the driving elements 15. The positioning means 36 including the cross member 41 is made of an organic resinous molding material as for example diallyl phthalate and although being relatively rigid, at the transducer frequencies utilized, the cross member 41 behaves somewhat like a spring. In FIG. 7 spring means 41' represents the contact of the cross member 41 on the front surface 17 of the driving elements 15. As was stated with respect to FIG. 2, each of the driving elements 15 oscillates in a manner such that the front and rear surfaces 17 and 18 travel toward and away from one another. This situation is represented in FIG. 7 as follows. At maximum contraction each of the front surfaces 17 are maintained substantially in the common plane P1 by virtue of the spring means 41' representing the cross member 41. At a point of maximum expansion the front surfaces 17 of each of the driving elements 15 tend to compress each of the spring means 41' so that the front surfaces substantially lie in the common plane P2. Planes P1 and P2 represent the extremes of travel of the top surfaces of the driving elements 15 and the positioning means is operable to maintain the top surfaces in substantially a common plane throughout the distance from P1 to P2. Although the cross member 41 is schematically illustrated as the spring means 41' it is to be understood that the total movement, that is the distance from plane P1 to P2 is extremely small and in the order of a few angstroms.

Accordingly, there has been provided a linear array tranducer having a plurality of elongated oscillatory elements the construction and arrangement of components being such as to allow proper operation at oceanic depths not only in the hundreds of feet but in excess of 30,000 feet. The plurality of oscillatory driving elements utilized are housed in a sound absorbing backing material having an acoustic impedance substantially equal to that of seawater and the driving elements are indexed on the front surfaces thereof in a manner such that positioning means contacts the front surfaces only at a very small portion thereof. The front surfaces of the driving elements are maintained substantially in a common plane even at increased oceanic depths at which the desired beam pattern for which the transducer is designed, is not distorted. Bus bars and flexible lead epoxide to the driving elements eliminate the need for mechanical spring contacts.

What is claimed is:

1. A transducer comprising:
   an elongated oscillatory driving element having front, rear, and side surfaces;
   a sound absorbing material having an acoustic impedance approximately equal to that of the water medium in which the transducer is operating, and surrounding said rear surface and extending up said side surfaces of said elements; and
   positioning means contacting said front surface of said driving element for maintaining a positional orientation of said element.

2. A transducer comprising:
   an elongated oscillatory driving element having front, rear, and side surfaces;
   a sound absorbing material having an acoustic impedance approximately equal to that of the medium in which the transducer is operating, and surrounding said rear surface and extending up said side surfaces of said element; and positioning means contacting said front surface at only two spaced apart contact areas for maintaining a positional orientation of said element.

3. A transducer comprising:

an elongated oscillatory driving element having front, rear, and side surfaces;

a sound absorbing rubber material having an acoustic impedance approximately equal to that of seawater, surrounding said rear surface and extending up said side surfaces of said element; and positioning means contacting said front surface at the two ends thereof, the front surface therebetween being out of contact with said positioning means.

4. A transducer comprising:

elongated oscillatory driving means having a radiating front surface;

sound absorbing material having an acoustic impedance approximately equal to that of seawater, surrounding said driving means except at said front surface; and positioning means contacting said front surface at a plurality of spaced apart contact areas for maintaining a positional orientation of said element.

5. A transducer for operation in a fluid medium comprising:

an elongated piezoelectric driving element having front, rear, and side surfaces;

an elongated block of sound absorbing material characterized in having an acoustic impedance substantially equal to that of said fluid medium;

said block having a longitudinally extending notch therein, said driving element being positioned within said notch;

a web member contacting said driving element at spaced apart positions on said front surface, the majority of said front surface being out of contact with said web member.

6. A transducer for operation in a fluid medium comprising:

an elongated piezoceramic driving element having front, rear, and side surfaces;

an elongated block of sound absorbing material characterized in having an acoustic impedance substantially equal to that of said fluid medium;

said sound absorbing material having a longitudinally extending notch portion, said driving element being positioned within said notch portion;

positioning means contacting said driving element at spaced apart positions on said front surface, the total area of contact being less than 10% of the total front surface area.

7. A transducer comprising:

an elongated piezoelectric driving element having a rectangular cross section;

a resilient sound absorbing backing member having an acoustic impedance substantially equal to the acoustic impedance of the fluid medium in which the transducer is operated;

said driving element being supported on three sides by said backing member;

a positioning member having longitudinal side members extending in the same direction as said elongated driving element and having a plurality of cross members connected to said side member;

said cross members having an indent portion contacting the exposed side of said driving element for maintaining said driving element in compressive contact with said backing member.

8. A transducer comprising:

an elongated piezoelectric driving element having a rectangular cross section;

a resilient sound absorbing backing member having an acoustic impedance substantially equal to the acoustic impedance of the fluid medium in which the transducer is operated;

said sound absorbing backing member being in contact with three sides of said driving element;

a plastic web member having longitudinal side members extending in the same direction as said elongated driving element and having a plurality of cross members perpendicular to said side members;

said side members including a beveled portion extending toward, but out of contact with said driving element;

said cross members contacting the fourth side of said driving element at the end portion of said driving element;

bus bar means extending in the same direction as said elongated driving elements; and flexible conductor leads operatively connecting said driving element with said bus bar means.

9. A transducer comprising:

a plurality of oscillatory driving elements arranged in a line array, each element having a radiating face;

a sound absorbing backing means having an acoustic impedance substantially equal to that of the medium in which the transducer is operated;

said driving elements being positioned within said sound absorbing backing with their radiating faces exposed;

positioning means for positioning and maintaining said radiating faces in a common plane.

10. A transducer comprising:

a plurality of elongated oscillatory driving elements each having side, rear, and front surfaces and being arranged in end to end relationship with the front surface of each said element lying in a common plane;

a sound absorbing material having an acoustic impedance approximately equal to that of the fluid medium in which the transducer is operated, surrounding the said rear surfaces and extending up said side surfaces of said driving elements; and positioning means contacting said plurality of driving elements at spaced apart areas on the front surfaces thereof, the major portion of said front surfaces being out of contact with said positioning means.

11. A transducer comprising:

a plurality of oscillatory driving elements each having parallel side and parallel front and back surfaces extending in the direction of a longitudinal axis, and arranged such that the longitudinal axis of each of said elements lies in substantially a straight line with said front surfaces in a common plane;

a sound absorbing material having an acoustic impedance approximately equal to that of the fluid medium in which the transducer is operated, surrounding the said rear surfaces and extending up said side surfaces of said driving elements; and positioning means contacting said plurality of driving elements at spaced apart areas on the front surfaces thereto, the major portion of said front surfaces being out of contact with said positioning means.

12. A transducer comprising:

a plurality of oscillatory driving elements each having parallel side and parallel front and back surfaces extending in the direction of a longitudinal axis, and arranged such that the longitudinal axis of each said element lies in substantially a curved line with said front surfaces in a common plane;

a sound absorbing material having an acoustic impedance approximately equal to that of the fluid medium in which the transducer is operated, surrounding the said rear surfaces and extending up said side surfaces of said driving elements; and positioning means contacting said plurality of driving elements at spaced apart areas on the front surfaces thereof, the major portion of said front surfaces being out of contact with said positioning means.

13. A transducer for transmitting and/or receiving acoustic energy in a fluid medium comprising:
a plurality of elongated piezoceramic driving elements arranged in end to end relationship and extending along a line, each said element having planar side, front and rear surfaces;
sound absorbing backing means contacting three of said surfaces of each said driving element, and characterized in having an acoustic impedance substantially equal to that of said fluid medium;
restraining means contacting each said driving element only at the ends thereof for positioning and maintaining the front surfaces of said elements in a common reference plane.

14. A transducer comprising:
a plurality of oscillatory driving elements arranged in a line array, each element having front, rear and side surfaces;
a sound absorbing material having an acoustic impedance substantially equal to that of seawater, extending up the sides, and rearwardly of said elements;
bus bar means extending substantially in the direction of said line array;
means electrically connecting said bus bar means with said driving elements including lead means cemented to and in electrical contact with each of said front and rear surfaces;
positioning means for positioning and maintaining the front surfaces of said elements substantially in a common plane.

15. A transducer comprising:
a plurality of oscillatory driving elements arranged in a line array, each element having front, rear and side surfaces;
a sound absorbing material having an acoustic impedance substantially equal to that of seawater extending up the sides and rearwardly of said elements;
bus bar means extending substantially in the direction of said line array;
means electrically connecting said bus bar means with said driving elements for producing a desired acoustic beam; and
positioning means for positioning and maintaining the front surfaces of said elements substantially in a common plane, said positioning means being effectively out of the path of said acoustic beam.

16. A transducer comprising:
a plurality of oscillatory driving elements arranged in a line array, each element having front, rear and side surfaces;
a sound absorbing material having an acoustic impedance substantially equal to that of seawater extending up the sides and rearwardly of said elements;
bus bar means extending substantially in the direction of said line array;
means electrically connecting said bus bar means with said driving elements for producing a desired acoustic beam; and
a web member having a plurality of apertures therein contacting said driving elements, the major portion of said front surfaces being aligned with said apertures.

17. A transducer comprising:
a housing;
a U-shaped channel member;
sound absorbing material, having an acoustic impedance substantially equal to that of the fluid medium in which the transducer is operated, positioned within said U-shaped channel member;
a plurality of elongated piezoceramic driving elements arranged in a line array, positioned within said sound absorbing material, each said driving element having a front surface out of contact with said sound absorbing material;
a plastic positioning member having longitudinally extending side members and a plurality of cross members perpendicular thereto;
said U-shaped channel member being connected to said side members, said cross members contacting front surfaces of said elements only at the end portions thereof;
means connecting said side members to said housing;
first and second bus bars extending in the direction of said elements each bus bar being located on opposite sides of said driving elements and being restrained by said cross members; and
flexible lead means operably connecting said first and second bus bars to the front and rear surfaces respectively of said driving elements.

18. A transducer comprising:
elongated oscillatory driving means, having front, rear and side surfaces;
said driving means having a length of greater than $150\lambda$ and a distance from one side surface to the other of $\frac{3}{4}\lambda$, and where $\lambda$ is the operating frequency wavelength in the fluid medium in which the transducer operates.

References Cited

UNITED STATES PATENTS

| | | | |
|---|---|---|---|
| 2,772,405 | 11/1956 | Schurman et al. | 340—10 X |
| 2,791,403 | 5/1957 | Hall. | |
| 2,829,361 | 4/1958 | Crandell et al. | 340—10 |
| 2,490,236 | 12/1949 | Shaper | 340—10 X |
| 3,277,435 | 10/1966 | Thompson et al. | 340—10 |

RICHARD A. FARLEY, *Primary Examiner.*

CHESTER L. JUSTUS, RODNEY D. BENNETT,
*Examiners.*

J. P. MORRIS, *Assistant Examiner.*